Patented Sept. 21, 1948

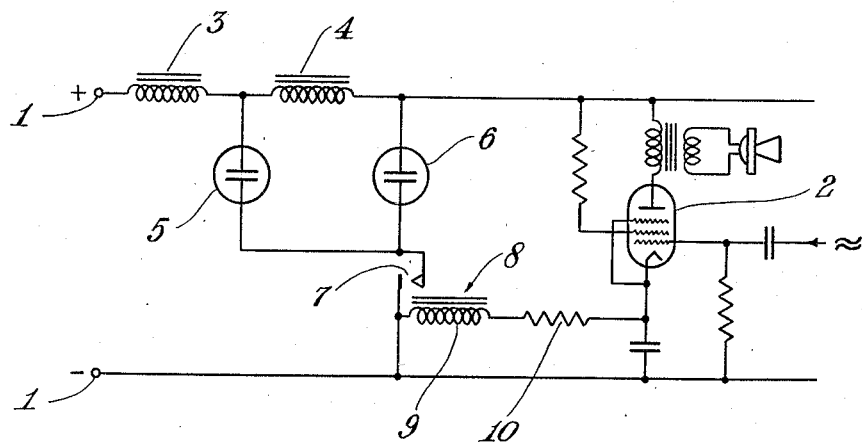

2,449,685

UNITED STATES PATENT OFFICE 2,449,685

RADIO RECEIVER OR AMPLIFIER ARRANGED TO BE FED FROM DIRECT CURRENT MAINS

Johannes Augustinus Josephus Bouman, Eindhoven, Netherlands, assignor, by mesne assignments, to Hartford National Bank and Trust Company, Hartford, Conn., as trustee Application May 9, 1946, Serial No. 668,425
In the Netherlands August 28, 1940

3 Claims. (Cl. 250—27)

This invention relates to a radio receiver or amplifier arranged to be fed from direct current mains.

In such devices it is customary to make use of a smoothing filter for smoothing the direct mains current feeding the amplifying tubes, which filter may consist of one or more iron-cored chokes and/or resistances inserted in the positive mains conductor, and one or more condensers connected between the positive and the negative mains conductors. In order that the voltage loss caused by the smoothing filter may be reduced as much as possible use is preferably made of condensers having a high capacity and more particularly electrolytic condensers.

However, the use of unipolar electrolytic condensers in the smoothing filter has the drawback that the condensers are liable to rapid destruction upon wrong polarisation of the junction terminals.

To protect a unipolar electrolytic condenser used in a smoothing filter it is already known to connect a steadying resistance of, say, 2000 ohms in the positive mains conductor and in series with the condenser. However, such a steadying resistance often involves undue voltage losses.

In devices of the kind referred to above the said drawback is, according to the invention, obviated by inserting the exciting winding of a relay in the anode-circuit of one of the amplifying tubes, by which relay the electrolytic condensers of the smoothing filter are put into circuit only when it is energised.

Since a current can flow through the amplifying tubes only upon correct polarisation of the mains connecting terminals damaging of the electric condensers due to wrong polarisation is avoided with certainty.

The exciting winding of the relay is preferably inserted in the cathode lead of the final amplifying tube(s) and the negative grid bias of the final amplifying tube(s) is at least partly taken from the exciting winding, the relay controlling a contact located in the connecting lead between the junction terminal(s) of the electrolytic condenser(s) and the negative mains conductor.

The invention will be more fully explained by reference to the drawing given by way of example.

In the sole figure the reference number 1 designates the mains connecting terminals of a radio receiving set adapted to be fed from direct current mains, of which set only the last amplification stage comprising a final amplifying tube 2 is represented. For smoothing the direct mains current there is provided a smoothing filter consisting of two chokes 3 and 4 located in a positive mains conductor and two unipolar electrolytic condensers 5 and 6 connected between the two mains conductors. The negative junction terminals of the condensers are connected to the negative mains conductor through a relay contact 7 which is open when the receiver is not operative. The contact 7 is controlled by a relay 8 whose exciting winding 9 is inserted in the cathode lead of tube 2.

If the junction terminals 1 of the mains are connected in a correct manner to the direct current mains a voltage which is not smoothed and positive relatively to the cathode is supplied to the anode of tube 2. As a result thereof a current will traverse the tube 2 and the relay 8 will become energised. Upon energisation the contact 7 is closed and the smoothing filter is made operative by putting the condensers 5 and 6 into circuit.

When choosing the anode current of tube 2 requisite for response of the relay in such manner that the relay responds before the preliminary amplifying tubes of the receiver become operative, or again by providing another contact which is controlled by the relay 8 and puts the loudspeaker into circuit, annoying hum can be avoided which might be audible due to the not smoothed or insufficiently smoothed anode voltage of one of the amplifying tubes for response of the relay.

If the mains junction terminals are not connected in a correct manner to the mains, consequently by wrong polarisation, no current can traverse the tube 2. In this case the relay 8 is consequently not energised so that the condensers 5 and 6 remain out of circuit.

The voltage drop ensuing at the exciting winding 9 of the relay may be used for the obtainment of a negative grid bias of one of the amplifying tubes and more particularly of the final amplifying tube. In the circuit represented in the drawing the negative grid voltage of tube 2 is taken from the exciting winding 9 and a resistance 10 connected in series therewith and supplied to the grid in the usual way.

It will be appreciated that the invention may be used not only in sets arranged to be exclusively fed from direct current mains, such as the receiver represented in the drawing, but that it may also be used in receivers or amplifiers arranged to be fed from direct current and alternating current supplies, wherein damaging of the electrolytic condensers might occur upon wrong polarisation of the junction terminals.

What I claim is:

1. An electronic circuit arrangement for operation from a direct current supply, comprising a filter having the input thereof connected to said supply and comprising a unipolar electrolytic capacitor, an electron discharge tube having an anode and a cathode and being connected across the output of said filter, a relay having an exciting winding and contactors associated therewith to be closed when said relay is energized, and means connecting said contactors to said electrolytic capacitor to connect same into said circuit arrangement, said exciting winding being interposed in the anode-cathode circuit of said electron discharge tube whereby said relay is energized to connect said capacitor into said circuit arrangement only when said filter is connected to said supply with correct polarity.

2. An electronic circuit arrangement for operation from a direct current supply, comprising a filter having the input thereof connected to said supply and comprising a unipolar electrolytic capacitor, an electron discharge tube having an anode, a grid and a cathode and being connected across the output of said filter, a relay having an exciting winding and contactors associated therewith to be closed when said relay is energized, means connecting said contactors to said electrolytic capacitor to connect same into said circuit arrangement, said exciting winding being interposed in the cathode circuit of said electron discharge tube whereby said relay is energized to connect said capacitor into said circuit arrangement only when said filter is connected to said supply with correct polarity, and means to apply the potential appearing across the exciting winding of said relay to the grid of said electron discharge tube to bias same with respect to the cathode.

3. An electronic circuit arrangement for operation from a direct current supply, comprising a filter having the input thereof connected to said supply, said filter comprising impedance elements connected in series and a plurality of unipolar electrolytic capacitors having the positive terminals thereof connected to the terminals of said impedance elements and having the negative terminals thereof connected together, an electron discharge tube having an anode, a grid and a cathode and being connected across the output of said filter, a relay having an exciting winding and contactors associated therewith to be closed when said relay is energized, means to connect said contactors to the negative terminals of said electrolytic capacitors to connect same into said circuit arrangement, a resistor connected in series with said exciting winding, said series connected resistor and exciting winding being interposed in the cathode circuit of said electron discharge tube whereby said relay is energized to connect said capacitor into said circuit arrangement only when said filter is connected to said supply with correct polarity, and means to apply the potential appearing across said series connected resistor and exciting winding to the grid of said electron discharge tube to bias same negatively with respect to said cathode.

JOHANNES AUGUSTINUS JOSEPHUS BOUMAN.

REFERENCES CITED

The following references are of record in the file of this patent:

FOREIGN PATENTS

| Number | Country | Date |
| --- | --- | --- |
| 551,234 | Great Britain | Feb. 12, 1943 |